Patented Sept. 27, 1932

1,879,577

UNITED STATES PATENT OFFICE

FRIEDRICH WILHELM STAUF, OF COLOGNE-DEUTZ-ON-THE-RHINE, AND HERMANN HAGENEST, OF WIESDORF-LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR PRECIPITATING IRON FROM THE SOLUTIONS FREED FROM COPPER OBTAINED BY BURNING PYRITES WITH CHLORINE

No Drawing. Application filed June 4, 1930, Serial No. 459,256, and in Germany July 12, 1929.

The present invention relates to a process for precipitating by means of earth alkali metal chlorates the iron contained in solutions which are obtained by lixiviating chlorinated roasted pyrite ores with water or diluted acids.

The solutions obtained by lixiviating chlorinated roasted pyrite ores with water or diluted acids contain sodium sulfate and valuable metals such as copper, cobalt and zinc. The sodium sulfate is obtained by freezing out. The copper is obtained in the known manner by cementation with iron. For obtaining cobalt and zinc from the iron containing solution it is necessary to remove the iron quantitatively. The removal of the iron is effected by converting the whole of the iron present in the solution into the ferric form by oxidation. In this oxidation stage the iron is precipitated in form of hydroxide by adding slaked lime, without the formation of insoluble hydroxides of the other metals occurring.

Up to now the oxidation has been effected by means of chlorine or by means of alkali metal chlorates according to the equation:

$$KClO_3 + 3H_2SO_4 + 6FeSO_4 = 3H_2O + KCl + 3Fe_2(SO_4)_3$$

According to the present invention earth alkali metal chlorates are used in this process for oxidizing the iron. This mode of working has considerable advantages over the working with alkali metal chlorates, since the earth alkali metal chlorates, especially the calcium chlorate, is considerably cheaper, say to about 50%, than the alkali metal chlorates, and since the earth alkali metal precipitates at the same time the sulfuric acid present in the solution in form of earth alkali metal sulfate.

When using calcium chlorate the solution obtained by introducing chlorine into a heated suspension of slaked lime in water is directly employed or the solution obtainable by electrolysis of hot aqueous calcium chloride solution, the calcium chloride which eventually is present in the solution being not harmful to the process. The chlorates of the other earth alkali metals as strontium and barium are used in the same manner. The quantity of chlorate used is to be calculated according to the quantity of iron present in the solution.

Our invention is illustrated by the following example without being restricted thereto:

*Example.*—A solution from which the copper and the greatest part of the sodium sulfate is removed contains in one litre:

25 grams of iron in ferrous form
60 grams of zinc
0,6 grams of cobalt
15 grams of sulfate sulfur 1000 parts by volume of this solution are heated to about 65° C. and 90 parts by volume of a chlorate solution containing 87 grams of calcium chlorate in one liter are added. After one hour the iron is completely converted into the ferric form. Now the calculated quantity of burnt lime is added, and the iron is converted into ferric hydroxide, which precipitates. The precipitate, containing also the calcium sulfate produced, is filtered and the filtrate is worked up according to known methods for obtaining cobalt and zinc.

We claim:—

1. In the process for precipitating iron from copper free solutions obtained by lixiviating chlorinated burnt pyrites, extracting the burnt ores with solutions of the group consisting of water and diluted acids and removing the copper by cementation with iron the step which comprises oxidizing the iron and precipitating the sulfuric acid present by the addition of earth alkali metal chlorate, and precipitating the ferric ion formed by the addition of burnt lime.

2. In the process for precipitating iron from copper free solutions obtained by lixiviating chlorinated burnt pyrites, extracting the burnt ores with solutions of the group consisting of water and diluted acids and removing the copper by cementation with iron the step which comprises oxidizing the iron and precipitating the sulfuric acid present by the addition of calcium chlorate, and precipitating the ferric ion formed by the addition of burnt lime.

In testimony whereof, we affix our signatures.

FRIEDRICH WILHELM STAUF.
HERMANN HAGENEST.